United States Patent
Kojima et al.

[19]
[11] Patent Number: 6,163,126
[45] Date of Patent: *Dec. 19, 2000

[54] ELECTRONIC DEVICE

[75] Inventors: Hiroyuki Kojima; Noriaki Shimura; Joji Kitahara, all of Shiojiri, Japan

[73] Assignee: Seiko Epson Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/284,384
[22] PCT Filed: Aug. 11, 1998
[86] PCT No.: PCT/JP98/03570
  § 371 Date: Apr. 12, 1999
  § 102(e) Date: Apr. 12, 1999
[87] PCT Pub. No.: WO99/08375
  PCT Pub. Date: Feb. 18, 1999

[30] Foreign Application Priority Data

Aug. 11, 1997 [JP] Japan .................... 9-216775

[51] Int. Cl.[7] .................... G05B 19/40; G04C 3/00
[52] U.S. Cl. .................... 318/685; 318/696; 368/157; 368/160; 368/202; 368/204
[58] Field of Search .................... 318/138, 647, 318/685, 696; 368/155–157, 76, 160, 80, 204, 217–219, 202

[56] References Cited

U.S. PATENT DOCUMENTS

| | | | |
|---|---|---|---|
| 4,074,179 | 2/1978 | Kuo et al. | 318/696 |
| 4,316,274 | 2/1982 | Ushikoshi | 368/66 |
| 4,321,520 | 3/1982 | Ueda et al. | 318/696 |
| 4,321,521 | 3/1982 | Ueda et al. | 318/696 |
| 4,326,278 | 4/1982 | Shida et al. | 368/157 |
| 4,352,172 | 9/1982 | Ueda et al. | 368/76 |
| 4,361,410 | 11/1982 | Nakajima et al. | 368/157 |
| 4,433,401 | 2/1984 | Shida et al. | 368/204 |
| 4,493,559 | 1/1985 | Ishida et al. | 368/74 |
| 4,533,257 | 8/1985 | Kitano et al. | 368/202 |
| 5,365,458 | 11/1994 | Tamura et al. | 364/506 |

FOREIGN PATENT DOCUMENTS

| | | |
|---|---|---|
| 58-68683 | 4/1983 | Japan . |
| 59-40186 | 3/1984 | Japan . |
| 60-56080 | 12/1985 | Japan . |
| 61-47390 | 10/1986 | Japan . |
| 63-34435 | 7/1988 | Japan . |
| 1-244389 | 9/1989 | Japan . |
| 2-22349 | 5/1990 | Japan . |
| 6-235777 | 8/1994 | Japan . |

*Primary Examiner*—Paul Ip
*Attorney, Agent, or Firm*—Stroock & Stroock & Lavan LLP

[57] ABSTRACT

In an electronic apparatus such as a timing device capable of a quick-moving operation, a detecting coil wound coaxially with a driving coil for driving a rotor is arranged, a feedback-induced voltage appearing in the detecting coil is detected by a detector circuit, and a first peak appearing first subsequent to the supply of a drive pulse and having the same polarity as the drive pulse is picked up to detect the rotation of a rotor. Based on the detected timing of the first peak, a next drive pulse is supplied, and the drive pulse is thus fast supplied while the rotation of the rotor is checked. This arrangement allows a quick-moving operation free from faulty watch hand driving to run even faster.

40 Claims, 9 Drawing Sheets

ELECTRONIC DEVICE

TECHNICAL FIELD

The present invention relates to an electronic apparatus having a stepping motor, such as a timing device, and, more particularly, to an electronic apparatus that permits a stepping motor to run in a quick-moving operation.

BACKGROUND ART

A stepping motor is also called a pulse motor, a stepping motor, a stepper motor, or a digital motor, and is a motor that is driven by a pulse and functions as an actuator for digital control devices. Compact electronic apparatuses suitable for portable applications have been developed and miniature and light-weight stepping motors find widespread use as an actuator for these electronic apparatuses. Typical of these electronic apparatuses are timing devices such as an electronic watch, a timing switch and a chronograph.

In a stepping motor 10 for use in such a timing device as shown in FIG. 11, a disklike rotor 13 with two magnetic poles is sequentially rotated within a unitary stator 12 delineated with magnetically saturated sections 17 with their outer edge notched, and the rotor 13 is rotated by a drive pulse of an appropriate frequency, for example, 1 Hz, and the rotary force of the rotor 13 drives watch hands. To avoid faulty driving of the watch hands, checking that the rotor 13 rotates normally by the drive pulse is important, and for this reason, a current or a voltage feedback-induced in a driving coil by the rotation of the rotor 13 is thus detected as shown in FIG. 12.

As shown, a first peak PM1 opposite in polarity to a drive pulse PW appears as a current (feedback-induced current) feedback-induced by the rotation of the rotor 13 when the rotor 13 passes a position 90 degrees spaced from a stable position. The rotor 13 rotates further, and when the rotor 13 passes a stable position B in the opposite polarity side, which is a destination (in the opposite polarity), 180 degrees apart, past a position A where the feedback-induced current becomes zero, a large first peak PP1 having the same polarity as the drive pulse PW appears. Second peaks PM2 and PP2 are generated along with swings (vibration) until the rotor 13 is stabilized and stops.

Although the first peaks PM1 and PP1 are strong in level, they are affected by transient currents TW of the drive pulse PW, and it is difficult to separate the first peaks PM1 and PP1 from the drive pulse PW in time. In the conventional watch hand driving, the second peaks PM2 and PP2, though they are weak in strength but easy to separate, are chopper-amplified by a chopper pulse, and are captured as a feedback-induced current, and used to detect the rotation of the rotor.

Today, a variety of functions are incorporated in a timing device such as a wristwatch, and in one of such functions, a stepping motor is driven faster than normal hand driving to set time automatically or manually. A quick-moving operation under which the stepping motor is driven fast requires that the drive pulse be supplied at a short period. For time setting, the watch needs to be driven paying attention not to cause faulty watch hand driving, namely, not to cause an erratic rotation of a rotor.

It is an object of the present invention to provide an electronic apparatus that allows a stepping motor to perform reliably a quick-moving operation.

DISCLOSURE OF THE INVENTION

To this end, the electronic apparatus with the stepping motor of the present invention picks up a power feedback-induced by the rotation of a rotor, in the form of current or voltage, when it is operated in a quick-moving operation, thereby detecting a first peak, and feeds a drive pulse for a quick-moving operation while checking the rotation of the rotor. Among first peaks, the one which is on the same polarity as the drive pulse, late in time and easy to separate from the drive pulse, is detected so that a quick-moving operation drive pulse is reliably output at a proper timing.

Specifically, the electronic apparatus of the present invention includes a stepping motor comprising a stator having a driving coil and a multi-magnetic-pole rotor that rotates in the stator, a drive unit for supplying a drive pulse to the driving coil to drive the rotor, a drive control unit for controlling the drive unit to supply a quick-moving operation drive pulse and for adjusting the timing of the quick-moving operation drive pulse, and a position detector unit for detecting a first peak of power of the same polarity as the drive pulse immediately prior to the first peak, out of powers feedback-induced in response to the rotation of the rotor, wherein the drive control unit controls the output timing of the subsequent drive pulse based on the detected timing of the first peak.

Since the first peak is detected earlier than a second peak that is used in the detection of the rotation of the conventional stepping motor, the timing of supplying the drive pulse is made earlier, and a quick-moving operation is carried out faster. Since the first peak of the same polarity is detected, it is separated easier from the drive pulse than other first peaks, and the detection of the first peak of the same polarity verifies that the rotor has reached its stable position. Since it is verified that the rotor has reliably rotated, supplying a next drive pulse at a next appropriate timing permits the next drive pulse to be supplied in agreement with the direction of rotation of the rotor. The energy for the quick-moving operation is thus saved.

Since the quick-moving operation drive pulse is supplied while the rotation or non-rotation of the rotor is being monitored, a reliable quick-moving operation free from faulty hand driving is performed. When the rotational speed of the rotor increases because of the quick-moving operation, the feedback-induced power attributed to the rotation of the rotor rises, causing the first peak to rise, and thereby making it easier to detect the position of the rotor based on the feedback-induced power, and the timing detection is reliably made.

The first peak is also detected from the power feedback-induced in the driving coil. However, with a detecting coil arranged in addition to the driving coil in the stator of the stepping motor, the position detector unit detects the power feedback-induced in the detecting coil so that the effect of the drive pulse is controlled, and the drive pulse and the first peak are easy to separate from each other and the position check of the rotor becomes easy. Although it may be possible that the driving coil and the detecting coil are separately wound, both the driving coil and the detecting coil are coaxially wound, and in such a case, at least one of the two coils wound internally is preferably wound in a regular winding fashion. In this way, when the driving coil is wound externally, its effect on the stepping motor is controlled. When the detecting coil is wound externally, the detection capability of the first peak is stabilized because the resistance of the detecting coil is controlled.

The detecting coil reliably detects not only a quick-moving operation drive pulse, but also a power that is feedback-induced when a drive pulse for normal speed rotation is supplied, and the detecting coil is thus used to detect the position of the rotor at a normal speed, for example, when the rotor is driven by a drive pulse of 1 Hz or so that is used for hand driving of the timing device.

To detect efficiently the first peak of the same polarity, the position detector unit preferably detects a feedback-induced power, amplified by a chopper pulse of the same polarity as the immediately prior drive pulse. By selecting at least one of the timing, the frequency and the duty factor of the chopper pulse depending on the pulse width of the supplied drive pulse or the like, the effect of transient currents and high-frequency noise (spike noise), attributed to the drive pulse, are minimized, and the timing detection is thus reliably performed.

Based on the immediately prior drive pulse, for example, the output timing and end timing of the immediately prior drive pulse, a dead time (mask time) during which a feedback-induced power attributed to the rotation of the rotor is not detected is set up to mask a signal supplied to the position detector unit by the driving coil or the detecting coil, and the effect of the transient currents and spike noise, attributed to the drive pulse, is controlled, and the timing detection is thus reliably performed.

When the stator is a unitary-body stator with a magnetically saturated portion, the change in feedback-induced power from a peak in an opposite polarity to a peak in the same polarity is mild, and it is difficult to detect zero voltage and determine a particular timing. For this reason, the position detector unit preferably acquires the detected timing by comparing directly a power feedback-induced in response to the rotation of the rotor, or the feedback-induced power chopper amplified, to a reference level. Although a comparator may be used to compare it to the reference level, a threshold of an inverter is used as a reference value (reference level) to acquire the detected timing, and this arrangement reduces the count of circuit elements, lowering power consumption.

Not only in an electronic apparatus driven by a primary battery, but also in an electronic apparatus having a generating unit therewithin, equipped with a charge and discharge type power supply unit powering a drive unit, the supply voltage fed to the drive unit varies. When the supply voltage rises, the root-mean-square power of the drive pulse increases, heightening the speed of the rotor, and making it difficult to separate the first peak from the drive pulse, and the effect of transient currents and spike noise becomes pronounced. For this reason, when the supply voltage of the power supply unit rises, the drive control unit preferably supplies the drive pulse of a narrow pulse width to detect reliably the first peak. When the supply voltage of the power supply unit is low, the drive control unit preferably supplies the drive pulse of a wide pulse width to assure root-mean-square power and to obtain a sufficiently strong first peak. When the supply voltage of the power supply unit drops greatly, the level of the first peak becomes too low to acquire the detected timing, and the drive pulse is preferably supplied at fixed time periods to perform the quick-moving operation reliably.

When the period of the timing detected by the position detector unit becomes short, the effect of the drive pulse on the detection of the first peak is minimized by supplying the drive pulse of a narrow pulse width from the drive control unit. Since this reduces the root-mean-square power of the drive pulse, the speed of the stepping motor in the quick-moving operation is stabilized. When the period of the timing detected becomes long on the other hand, there is a small effect of the supplying of the drive pulse of a wide pulse width on the detection of the first peak, and the speed in the quick-moving operation is thus increased by increasing the root-mean-square power of the drive pulse.

When the pulse width of the drive pulse is too wide, there is a possibility that it works as a brake against the direction of rotation of the rotor. Typical of such a case is when the drive pulse lasts later than the detection of the peak point of the feedback-induced power. By extracting a constant time from the detected timing or by supplying a drive pulse, which is shortened by a certain ratio, subsequent to the detected timing, the drive pulse free from braking effect is supplied for fast driving. To this end, the drive control unit preferably supplies a drive pulse, which is shorter in pulse width by a predetermined time than a time interval between the output of the drive pulse and the detected timing, at the timing of the subsequent drive pulse. The drive control unit may supply a drive pulse, which is shorter in pulse width than and proportional to a time interval between the output of the drive pulse and the detected timing, at the timing of the subsequent drive pulse. When the predetermined drive pulses having stepwise increasing pulse widths are selectable, the drive control unit may supply drive pulses of stepwise shortening pulse widths depending the interval until the acquisition of the detected timing.

By allowing the drive control unit to supply the subsequent drive pulse after a predetermined delay time from the timing detected by the position detector unit, the direction of swing (direction of vibration) of the rotor is aligned with the direction of driving by the drive pulse so that the energy for rotating the rotor is saved, and the power consumption during the quick-moving operation is thus reduced.

In the electronic apparatus that detects the rotation or non-rotation by detecting the first peak of feedback-induced power, a process required in the event of failure to detect the first peak is important. When the drive control unit can supply the drive pulse of a predetermined root-mean-square power but with the position detector unit unable to detect the timing of the first peak, it is possible to supply a subsequent drive pulse different in polarity from the immediately prior drive pulse, a predetermined time elapse, assuming that the rotor has rotated when the position detector unit provides no timing detected. In this way, the speed in the quick-moving operation is continued without lowering it so much.

To detect reliably the first peak of the feedback-induced power, a larger value of feedback-induced power is preferred. At the start of the quick-moving operation, the feedback-induced power is small because the rotor speed is low, and the probability of detection of the increase or decrease in the feedback-induced power, the change in polarity and the first peak tends to become low. For this reason, a voltage step-up unit for stepping up the supply voltage (source voltage) supplied to the drive unit is arranged, and the drive control unit causes the voltage step-up unit to feed the stepped-up supply voltage to the drive unit at the start of the quick-moving operation, allowing the rotor to reach a predetermined quick-moving operation speed.

Since the feedback-induced power is small at the start of the quick-moving operation, a detection threshold value in the position detector unit for detecting the feedback-induced power attributed to the rotation of the rotor may be set to be lower at the start of the quick-moving operation.

When supplying a group of pulses, including a first drive pulse for starting the driving and subsequent several drive pulses, at the start of the quick-moving operation, the drive control unit supplies regularly the drive pulses, and after a predetermined quick-moving operation speed is smoothly reached, the drive pulse is supplied at the detected timing of the first peak so that the speed increase is made under a reliable state.

It is important that the drive control unit supply the drive pulse of a root-mean-square power equal to or larger than the root-mean-square power of the drive pulse for normal rotation, at the start of a quick-moving operation to make the rotor rotate reliably.

If a residual magnetic flux of the immediately prior drive pulse is present in the stator at the start of the quick-moving operation, increasing the rotor speed is difficult. To cope with this problem, the drive control unit preferably supplies a degaussing pulse opposite in polarity to the immediately prior drive pulse for normal rotation, at the start of a quick-moving operation to accelerate the rotor speed.

When the drive control unit can select one from among the predetermined drive pulses having stepwise increasing root-mean-square powers, the drive control unit selects and supplies drive pulses, one by one, in the increasing order of magnitude of root-mean-square power, from small to large power, or in the decreasing order of magnitude of root-mean-square power, from large to small power, at the start of a quick-moving operation, determines whether the rotor has rotated, and performs the quick-moving operation with a drive pulse having a minimum root-mean-square power still capable of rotating the rotor.

Preventing a faulty hand driving is important when is stopped a high-speed quick-moving operation, during which the drive pulse is output based on the phenomenon of the feedback-induced power arising from the quick-moving operation. The drive control unit preferably supplies, at the end of a quick-moving operation, an auxiliary pulse of a sufficiently large root-mean-square power or a regenerative pulse for regenerating power feedback-induced by the rotor, or both pulses to restrain the motion of the rotor.

By allowing the drive control unit to supply the drive pulse at the end of the quick-moving operation regularly rather than in accordance with the detected timing, the rotor is reliably reverted back to normal hand driving operation.

The rotor speed is gradually slowed by allowing the drive control unit to supply the drive pulse of a large root-mean-square power or the drive pulse of a plurality of sub-pulses at the end of the quick-moving operation. When a subsequent drive pulse is supplied after a predetermined delay time from the detected timing, the delay time can be controlled at the end of the quick-moving operation to slow the rotor speed.

The method of supplying the drive pulse in accordance with the detected timing of the first peak of the feedback-induced power attributed to the rotation of the rotor is preferred for reverse quick-moving operation (reverse run). In the reverse run, the position detector unit detects the second timing for the reverse rotation, based on the feedback-induced power attributed to the rotation of the rotor, and the drive control unit controls the output timing of the drive pulse for reverse rotation based on the detected second timing to start the reverse run. The drive control unit may supply an auxiliary pulse of a small root-mean-square power and opposite in polarity to a drive pulse for a reverse rotation, prior to the start of the reverse rotation, thereby allowing the rotor to be rotated in a reverse direction.

Since the rotor position is known by acquiring the timing of the peak, the stop timing corresponding to the falling edge of the drive pulse may be controlled after verifying that the rotor has rotated. Specifically, by allowing the drive control unit to stop the drive pulse based on the timing detected by the position detector unit, the rotor is rotated even more reliably, and the occurrence of a reverse rotation, for example, is efficiently precluded. This arrangement permits a high-speed and reliable quick-moving operation. Even when the supply voltage varies, or the load torque of the rotor varies, the drive pulse of a sufficient root-mean-square power with these variations compensated for is automatically fed to the stepping motor. A quick-moving operation is thus reliably performed.

To acquire the timing of the peak during the supply of the drive pulse, the drive control unit supplies, from the drive unit, the drive pulse composed of a plurality of sub-pulses at the end of a quick-moving operation so that the position detector unit detects a feedback-induced power attributed to the rotation of the rotor when the sub-pulses are at a low level.

By arranging a detecting coil independently of the driving coil, the first peak of the feedback-induced power is efficiently detected in the middle of the supply of the drive pulse, and the drive pulse is stopped in accordance with the peak detection. Since the drive pulse is stopped after the detected timing, the effect of the transient currents and spike noise is minimized during the detection, and a reliable high-speed operation is thus carried out.

The position detector unit preferably sets a predetermined duration of time subsequent to the output timing of an immediately prior drive pulse, as a dead time (mask time) during which a feedback-induced power attributed to the rotation of the rotor is not detected, and the use of the mask time prevents noise or the like from suspending the drive pulse.

The drive control unit sets the timing of stopping the drive pulse after a predetermined time elapse when no detected timing is provided by the position detector unit, and the quick-moving operation is thus continuously operated.

The root-mean-square power of the drive pulse may be increased by extending the delay time between the detected timing and the stop of the drive pulse at the end of the quick-moving operation, and the rotation of the rotor is thus restrained.

BEST MODE FOR CARRYING OUT THE INVENTION

Figure 1:
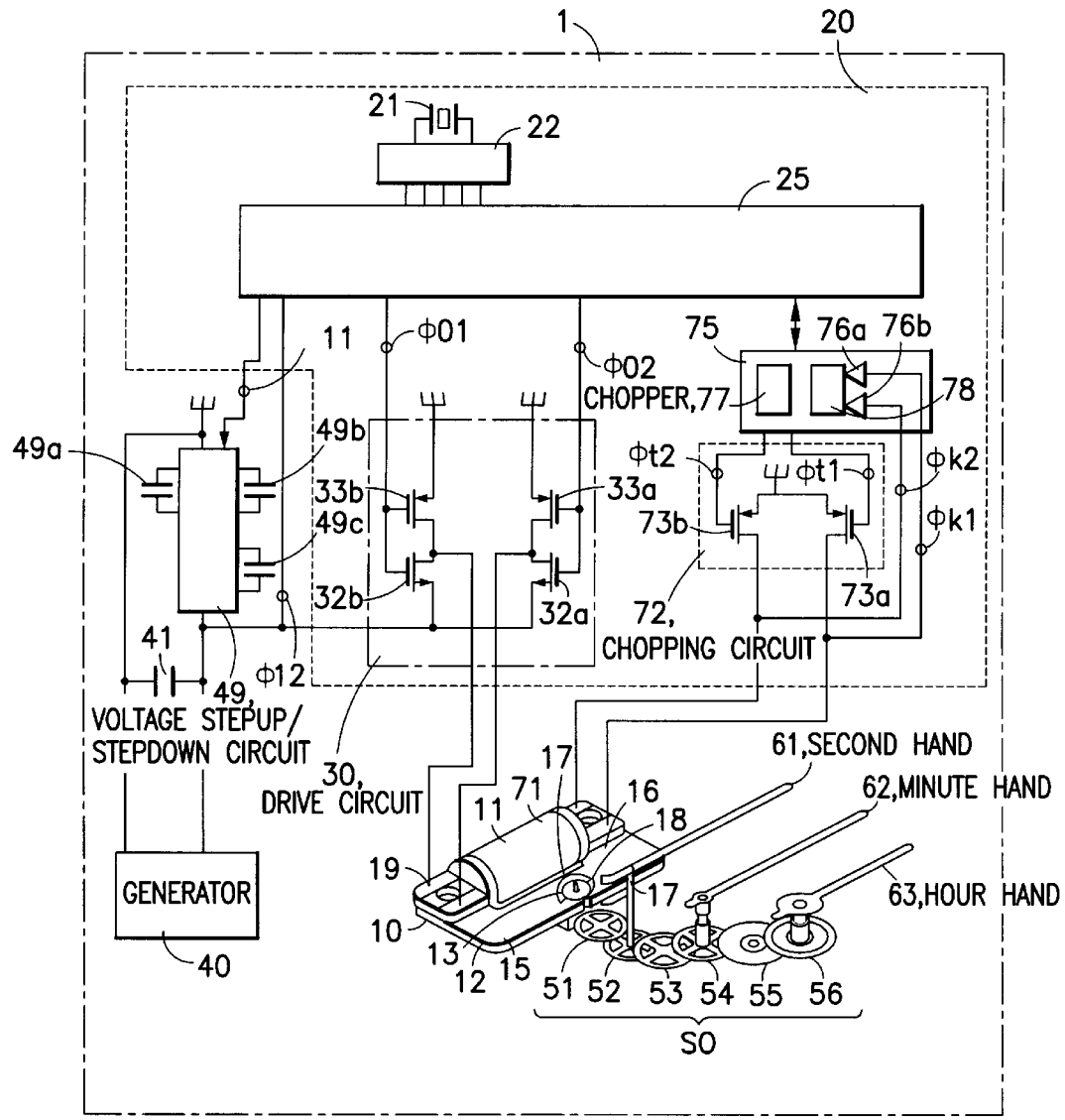
FIG. 1 is a block diagram showing a timing device incorporating the stepping motor of one embodiment of the present invention.

Referring to the drawings, the present invention is now discussed in more detail. FIG. 1 shows one example of timing device such as a wristwatch incorporating a stepping motor. The timing device 1 includes a stepping motor 10, a control unit 20 for driving the stepping motor 10, a gear train 50 for transferring the movement of the stepping motor 10, and a second hand 61, a minute hand 62, and an hour hand 63, all driven by the gear train 50. The stepping motor 10 includes a driving coil 11 which generates a magnetic force in response to a drive pulse supplied by the control unit 20, a stator 12 excited by the driving coil 11, and a rotor 13 that is driven by the magnetic field formed within the stator 12, and is a PM (permanent magnet rotating) stepping motor 10 in which the rotor 13 is constructed of a disklike two-pole permanent magnets. The stator 12 is provided with magnetically saturated portions 17 so that different magnetic poles are generated in phases (poles) 15 and 16 around the rotor 13 in response to the magnetic force generated by the driving coil 11. To control the direction of rotation of the rotor 13, an inner notch 18 is formed in the inner circumference of the stator 12 at its appropriate position to generate cogging torque to stop the rotor 13 at its adequate position.

The rotary motion of the rotor 13 in the stepping motor 10 is transferred to each hand by means of the gear train 50 which is coupled with the rotor 13 via pinions and is composed of fifth wheel and pinion 51, fourth wheel and pinion 52, third wheel and pinion 53, center wheel and pinion 54, a minute wheel 55 and an hour wheel 56. The second hand 61 is connected to the shaft of the fourth wheel and pinion 52, the minute hand 62 is connected to the center wheel and pinion 54, and the hour hand 63 is connected to the hour wheel 53, and the time is indicated by each hand in step with the rotation of the rotor 13. A transmission system (not shown) for indicating the year, the month and the day can be optionally connected to the gear train 50.

In the timing device 1, to indicate the time by the rotation of the stepping motor 10, a signal of a reference frequency is (time) counted so that a resulting drive pulse is regularly fed to the stepping motor 10. The control unit 20 for controlling the stepping motor 10 includes a pulse forming circuit 22 which generates a reference pulse having a reference frequency and pulse signals having different pulse widths and timings, using a reference oscillator 21 such as a crystal oscillator, a control circuit 25 for controlling the stepping motor 10 based on a variety of pulse signals supplied by the pulse forming circuit 22, and a detector circuit 75 for detecting the rotation of the rotor.

The control circuit 25 has the function of supplying a drive pulse P1 of a frequency of 1 Hz to the driving coil 11 via a drive circuit to drive the rotor 13 in the stepping motor 10 for normal hand driving, the function of outputting an auxiliary pulse P2 of a root-mean-square power larger than that of the drive pulse when the drive rotor 13 fails to rotate, the function of outputting a regenerative pulse Pr for regenerating the energy of the rotor subsequent to the auxiliary pulse, the function of outputting a degaussing pulse PE for degaussing, different in polarity from the auxiliary pulse P2, and the function of adjusting the root-mean-square power of the drive pulse. The control circuit 25 has a further function of supplying a drive pulse PW for a quick-moving operation in which the rotor 13 is driven at a speed higher than normal watch hand driving speed. The control circuit 25 has also the function of driving the rotor 13 at a high speed in the direction opposite to the normal direction of rotation using the drive pulse PW. The drive pulse PW is output at a timing detected by the detector circuit 75.

The drive circuit 30, which supplies a variety of drive pulses to the stepping motor 10 based on control signals $\phi o1$ and $\phi o2$ from the control circuit 25, includes a bridge circuit composed of an n-channel MOS transistor 33a and a p-channel MOS transistor 32a in series connection and an n-channel MOS transistor 33b and a p-channel MOS transistor 32b in series connection, and through these components, power a power supply 41 supplies to the driving coil 11 in the stepping motor 10 is controlled.

A coil section 19 of the stepping motor 10 of this example has a detecting coil 71 wound together with the driving coil 11, and the detecting coil 71 is connected to a chopping circuit 72. The chopping circuit 72 is composed of p-channel MOS transistors 73a and 73b connected in parallel, and amplifies voltages feedback-induced in the detecting coil 71 in response to chopper pulses that are supplied in the form of control signals $\phi t1$ and $\phi t2$ by the chopper 77 of the detector circuit 75. The feedback-induced voltages chopper-amplified are supplied to the detector circuit 75 as signals $\phi k1$ and $\phi k2$, and are subjected to level determination by detecting inverters 76a and 76b, and a position detector 78 determines the position of the rotor based on the result of level determination.

The timing device 1 of this example includes a generator 40 for charging the power supply 41, and a voltage step-up circuit 49 that steps up the voltage output from the power supply 41 and feeds it to the drive circuit 30 in the control unit 20. The voltage step-up circuit 49 in this example employs a plurality of capacitors 49a, 49b and 49c to step up or step down the voltage in stepwise fashion, and a control signal $\phi 11$ from the control circuit 25 in the control unit 20 adjusts the voltage supplied to the drive circuit 30. The output voltage of the voltage step-up circuit 49 is also sent to the drive control circuit 25 via a monitor circuit $\phi 12$ and the output voltage is thus monitored. Not only the voltage of the drive pulse P1 for the normal hand driving operation but also the voltage of the drive pulse PW for the quick-moving operation is controlled. Since the root-mean-square power of the drive pulses P1 and PW is controlled in pulse width and voltage level, a fine control of the drive power is possible, and the drive pulse of power appropriate for rotating the rotor 13 is supplied for power saving, while a high-speed and reliable quick-moving operation is carried out.

Figure 2A:
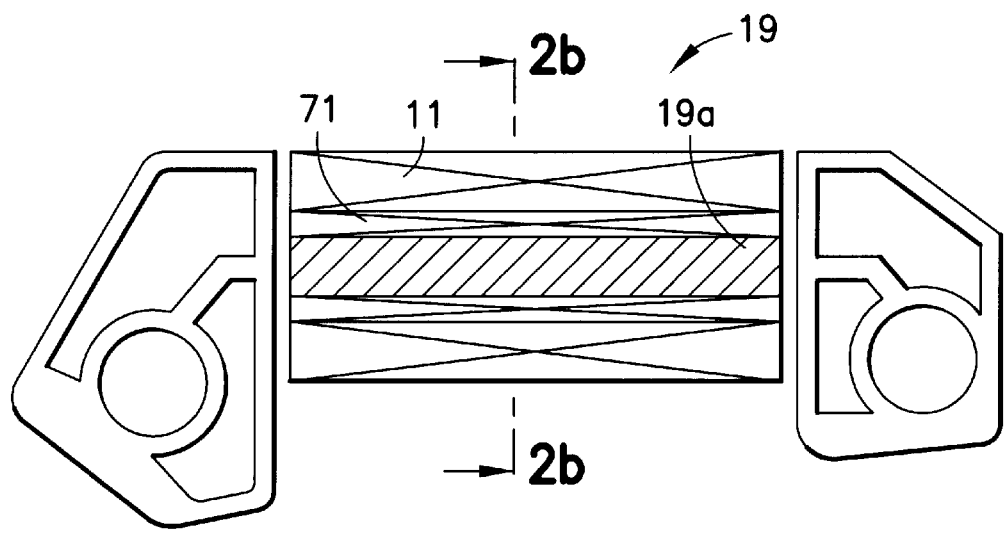
FIG. 2 is a cross-sectional view showing the coil of the stepping motor of FIG. 1.
Figure 2B:
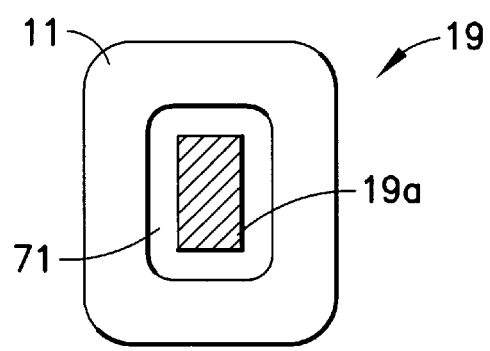

FIG. 2 is an enlarged view of the coil section 19 employed in the stepping motor 10 of this example. FIG. 2(a) is a sectional view of the coil section 19 taken along its longitudinal direction, and FIG. 2(b) is a sectional view of the coil section 19 taken along a plane perpendicular to the longitudinal direction. In the coil section 19 of this example, the detecting coil 71 is wound around a magnetic core 19a and the driving coil 11 is wound around the detecting coil 71. The internal detecting coil 71 is wound in a regular winding fashion so that its surface is generally uniform and flat, and even if the two coils are wound in a coaxial fashion, there occurs no drop in the performance of the driving coil 11 wound externally. It is perfectly acceptable to wind the driving coil 11 internally, and even in this case, the internal driving coil 11 is preferably wound in a regular winding fashion so that variations in resistance in the detecting coil wound externally are controlled to detect reliably the feedback-induced power. Although the driving coil 11 and the detecting coil 71 are separated from each other, but winding the driving coil 11 and the detecting coil 71 in a coaxial fashion saves the space for the coils, and the stepping motor 10 is made compact.

Figure 3:
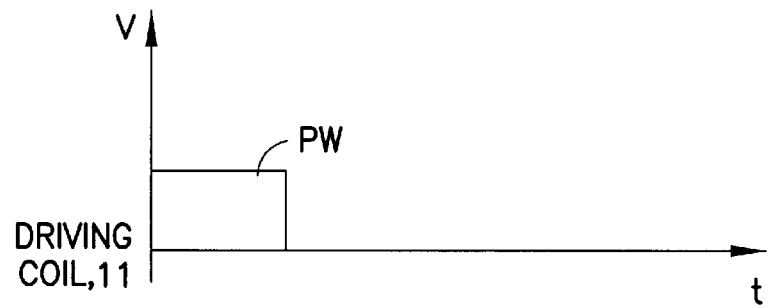
FIG. 3 diagrammatically shows voltage variations in a driving coil and a detecting coil of the stepping motor of FIG. 1.
Figure 3:
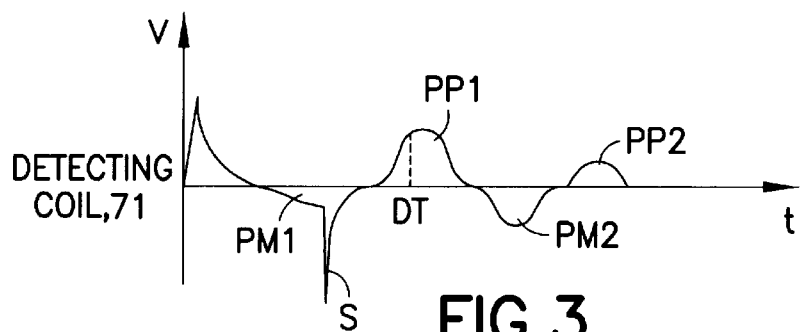
Figure 11:
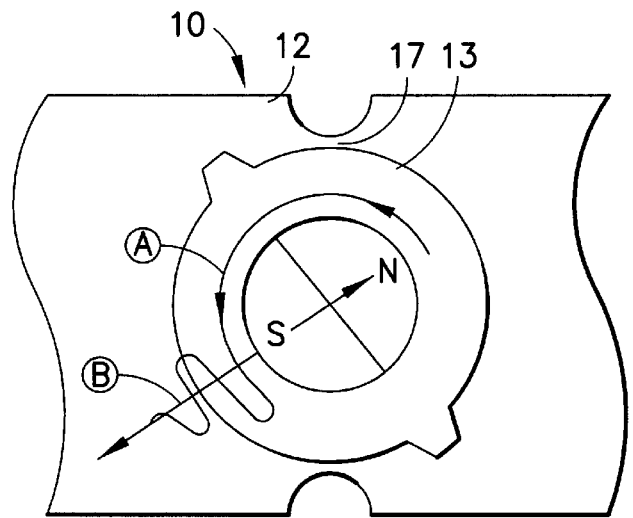
FIG. 11 diagrammatically shows a rotor that rotates in a stator.

FIG. 3 shows a voltage feedback-induced in the detecting coil 71 in response to the drive pulse PW applied to the driving coil 11. Although there occurs a spike S along with variations in the drive pulse PW in the detecting coil 71, no transient currents such as the one shown in FIG. 11 are generated, and a first peak PP1 of the feedback-induced power of the same polarity as the drive pulse PW appears in a state easy to detect. In one driving method, the first peak PP1 may be detected by any means, and a next drive pulse PW is generated in accordance with the timing (detected timing), and the rotor 13 is rotated at a high speed in a quick-moving operation. Considering that this driving method allows the drive pulse PW to be supplied at the detected timing DT of the first peak, this method is hereinafter called a self-exciting driving mode, in contrast to a mode (regular driving mode) in which the drive pulse PW is regularly supplied based on a predetermined frequency (period).

It is also possible to detect the first peak of the power feedback-induced in the driving coil instead of in the detecting coil. In such a case, it becomes important to narrow the width of the drive pulse PW or to set up an appropriate dead time to avoid the effect of the transient currents TW as will be described later.

In the self-exciting driving mode, by capturing the feedback-induced power excited by the rotation of the rotor 13 in the form of current or voltage, and by detecting the first peak PP1 later in time, easy to separate from the drive pulse, and having the same polarity as the drive pulse, out of the first peaks of the feedback-induced power, the position of the rotor 13 is detected earlier than the second peak of the feedback-induced power used in the rotation detection of the conventional stepping motor. For this reason, the output timing of supplying the drive pulse is made earlier, and the quick-moving operation is performed at a high speed. Because the first peak appearing first subsequent to the supply of the drive pulse PW is used as the detected timing DT, and because the timing of supplying the drive pulse is determined based on the detected timing DT, the time required to detect the position of the rotor is assured while the time required to acquire the detected timing is minimized. With a minimum duration of time, the position of the rotor 13 is checked while the drive pulse PW is output, and a high-speed and reliable quick-moving operation is possible.

Figure 12:
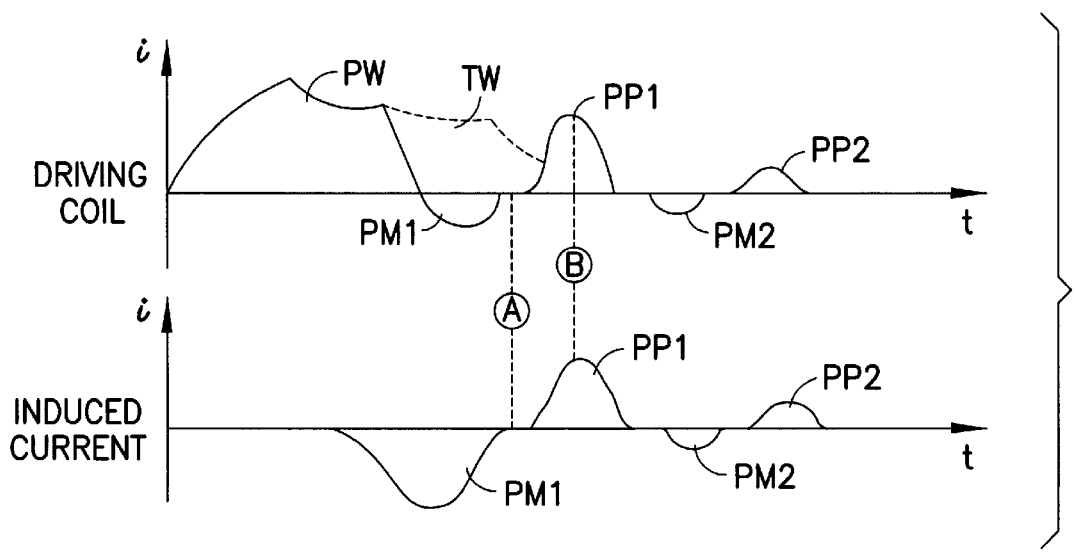
FIG. 12 diagrammatically shows the current variation taking place in the driving coil when the rotor rotates as shown in FIG. 11 and the variation in the feedback-induced current taking place along therewith.

Since the detection of the first peak PP1 indicates that the rotor 13 has reached its stable position as already described with reference to FIG. 11 and FIG. 12, watch hand driving is reliably carried out. It is possible to supply a next drive pulse at the timing in agreement with the direction of rotation of the rotor 13, because the drive pulse PW is output while the position of the rotor 13 is checked, and the root-mean-square power of the drive pulse is lowered. Since the pulse width PW of the drive pulse is thus narrowed, the separation of the first peak PP1 from the drive pulse becomes easier, and an even more reliable and high-speed quick-moving operation is carried out.

To detect the first peak PP1 of the same polarity, the polarity of the feedback-induced power may be detected or a point where the feedback-induced power falls to zero (zero crossing) may be detected. When there is the effect of an external magnetic field or variations in detected level, the detected timing of the zero crossing tends to be earlier than the timing the feedback-induced voltage actually becomes zero. The timing of the next drive pulse may rotate the rotor 13 in the reverse rotation, different from the expected direction of rotation of the rotor 13. In the timing device 1 of this example, the feedback-induced voltage, which is amplified by the chopping circuit 72 in accordance with a chopper pulse of the same polarity as that of the immediately prior drive pulse PW, is compared with the thresholds of the inverters 76a and 76b in the detector circuit 75. By comparing the feedback-induced voltage with a certain level (a voltage level or a current level) for detection, variations in detection level is reliably prevented, and position determination reflecting the position of the rotor 13 is thus performed. Since the feedback-induced voltage attributed to the rotation of the rotor 13 is set to be larger than an additional voltage attributed to an external magnetic field, the effect of the external magnetic field is eliminated. The detection level for determining the feedback-induced voltage (corresponding to the threshold of the inverter) is modified or controlled as required. The use of level detection allows the position of the rotor 13 to be accurately and reliably. By using a comparator instead of the inverter, the level of the feedback-induced voltage may be determined, but the use of the inverter offers a smaller component count of circuit elements. The control unit 20 including the detector circuit 75 is manufactured at a low cost while its power consumption is reduced at the same time.

Figure 4:
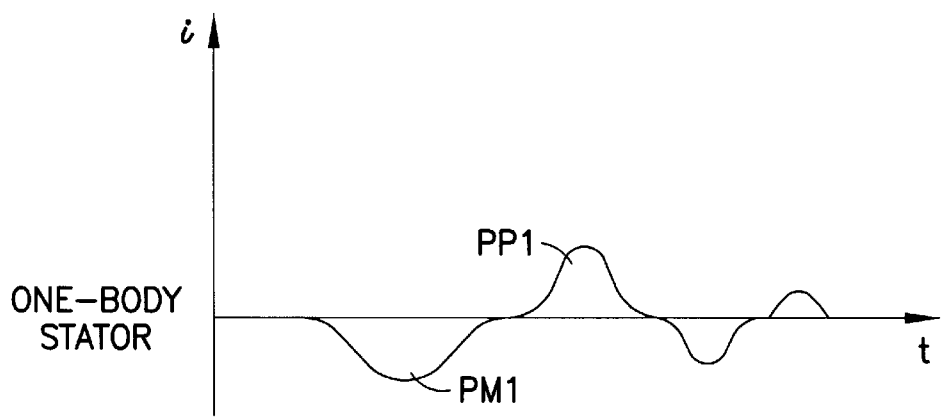
FIG. 4 diagrammatically shows variations in currents feedback-induced in a one-body stator and a two-body stator.
Figure 4:
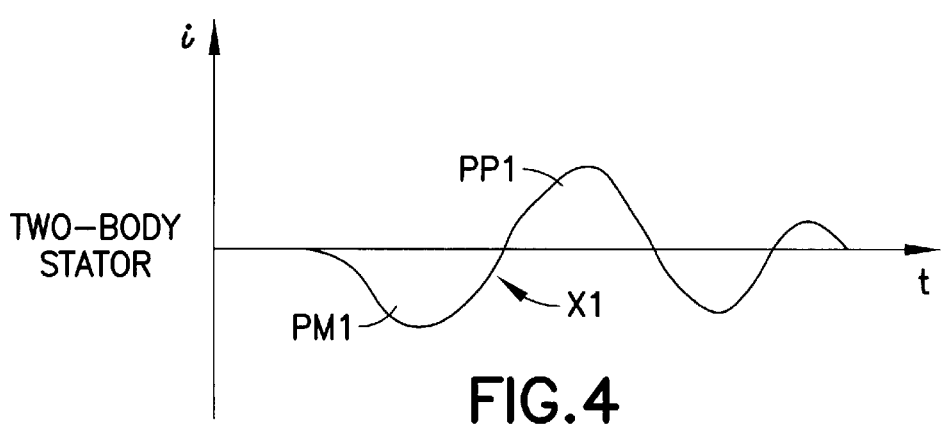

Referring to FIG. 4, in the one-body stator having the magnetically saturated sections 17, such as the stator 12 in this example, the feedback-induced voltage is not shaped in a regular sine wave, and its voltage change from a peak PM1 in the opposite polarity to a peak PP1 in the same polarity is mild. Detecting the zero crossing point X1 in the one-body stator is not so easy as in the two-body stator. Since a certain voltage level is detected in this example, the first peak PP1 is reliably picked up.

A feature of the feedback-induced voltage, other than the first peak PP1, may also be picked up to detect the position of the rotor 13, and the drive pulse is supplied at an appropriate timing in accordance with the detection result.

[Self-exciting driving in the middle of the quick-moving operation]

Figure 5:
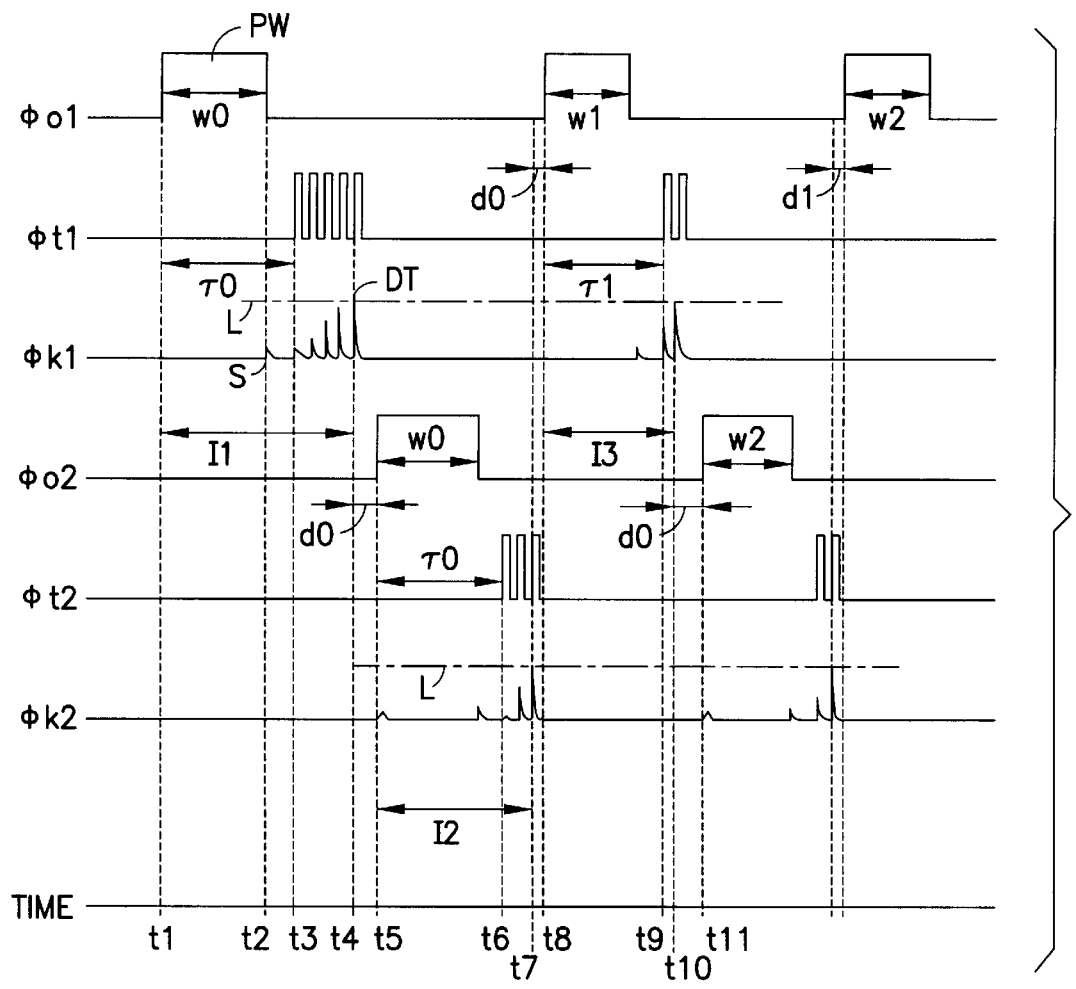
FIG. 5 is a timing diagram showing the process of a quick-moving operation, executed in the timing device shown in FIG. 1.

FIG. 5 is a timing diagram showing one example of the fast-run mode executed in the self-exciting driving mode. At time t1, a control signal φo1 for supplying the drive pulse PW of a pulse width W0 is output. When the drive pulse PW ends (transitioning from its high level to its low level) at time t2, a spike S, a high-frequency noise, occurs in a signal φk1 in the detecting coil 71. The chopper pulse for chopper-amplifying the voltage feedback-induced in the detecting coil is continuously supplied from time t1, at which the drive pulse PW started, to time t3, a mask time τ0 after time t1. The spike S is not chopper-amplified, unable to reach the detection level (the threshold values of the inverters 26). Since a predetermined time from the output timing of the immediately prior drive pulse is set as a dead time (mask time) τ, during which the feedback-induced power attributed to the rotation of the rotor is not detected, in order to mask the signal supplied from the detecting coil to the position detector unit, the effect of the spike noise S resulting from the drive pulse is eliminated, and the detection timing is reliably assured. The timing to which the mask time τ is referenced is not limited to the output timing, and alternatively, the mask time τ may start from the end timing of the drive pulse or other timing. The same is true of the case where the voltage feedback-induced in the driving coil is detected, and in this case, the mask time τ is set to be long enough not to detect a transient current attributed to the drive pulse so that the detection timing is reliably assured.

When the chopper pulse of the same polarity as that of the drive pulse PW is supplied at time t3, based on a signal φt1, a level resulting from the feedback-induced voltage amplified by the detecting coil 71 appears in a signal φk1. When the signal φk1 reaches a detection level L at time t4, at this timing as a detected timing DT, a next cycle for outputting a subsequent drive pulse PW is then started. When the detected timing DT is acquired, the chopper pulse ends. At least one of the timing, the frequency and the duty factor of the chopper timing is preferably selected based on the pulse width of the supplied drive pulse and based on whether the detecting coil or the driving coil is used, and is preferably adjusted so that the effect of the transient current and spike noise, attributed to the drive pulse, is eliminated and so that the detected timing is reliably obtained.

The next drive pulse PW of the opposite polarity is output, based on a signal φo2, at time t5, a predetermined delay time d0 after the detected timing. In this way, in the self-exciting driving mode, the output timing of the drive pulse PW is determined by the detected timing DT. The delay time D0 is set depending on the action of the rotor 13, and an appropriate time may be set as the delay time D0 through a simulation so that the direction of the rotor 13 is toward a next stable position. At time t6, after the mask time τ0 from the output of the next drive pulse PW, a chopper pulse of the same polarity as that of the drive pulse PW is output, and the feedback-induced power amplified by the chopper pulse appears in a signal φk2. When the level of the signal φk2 reaches the detection level L at time t7, the detected timing DT is obtained. In accordance with the detected timing DT (time t7), a next cycle for supplying a drive pulse at a next timing is started.

In this example, the interval I1 from the output of the drive pulse to the acquisition of the detected timing DT in the previous cycle is longer than the interval I2 in the next cycle. For this reason, the drive pulse PW having a pulse width W1 narrower than that of the previous drive pulse PW, is supplied at time t8, the delay time d0 after from the detected timing DT at time t7. When the period of the timing DT detected by the detector circuit 75 gets shorter, the influence of the drive pulse PW on the detection of the first peak PP1 is eliminated by supplying the drive pulse PW having a narrower pulse width W. Furthermore, by narrowing the pulse width W, the mask time τ is narrowed, and the stepping motor is driven at a high speed. When the pulse width W is narrowed, the root-mean-square power of the drive pulse PW is reduced, and the stepping motor is thus automatically controlled to be driven at an appropriate quick-moving operation speed.

Contrary to the case shown in FIG. 5, when the period of the detected timing DT gets longer each cycle, the supply of the drive pulse of a wide pulse width has only a marginal influence on the detection of the first peak, and by increasing the root-mean-square power of the drive pulse, the rotational speed of the rotor 13 is accelerated. By controlling the pulse width W of the drive pulse PW in this way, the detection of the eleventh peak is assured, while an automatic control is carried out so that the stepping motor is driven at an appropriate speed in a quick-moving operation.

Referring to FIG. 5, the timing at which the subsequent feedback-induced voltage is generated becomes earlier if the pulse width of the drive pulse PW gets narrower from W0 to W1. For this reason, the mask time is shortened from τ0 to τ1, and the chopper amplification is started at time t9, the mask time τ1 after time t8, and the first peak output at time t10 is reliably picked up to acquire the detected timing DT.

In the cycle commencing at time t8, the interval I3 from the output of the drive pulse PW at time t8 to the detected timing DT becomes narrower. In the cycle commencing at time t11, the drive pulse PW of an even narrower pulse width W2 is output. When the detected timing DT is obtained at time t12, the next cycle is started after a shortened delay time d1 that is set in accordance with the pulse width W2, and the drive pulse PW is then output. Because each cycle for supplying one drive pulse PW is varied in time in this way in the self-exciting driving mode in this example, the delay time d is preferably selected depending on the pulse width of the drive pulse PW or other factors so that the next drive pulse PW is supplied in agreement with the direction of swing (direction of vibration) of the rotor 13. The next drive pulse PW is supplied an appropriate delay time after the detected timing, and the direction of swing of the rotor and the direction of advance (direction of driving) of the rotor are aligned so that the rotor is smoothly rotated, and the energy applied to the rotor 13 is saved, and the power consumption in the quick-moving operation is thus reduced.

Several methods for adjusting the pulse width of the drive pulse PW are contemplated. If the drive pulse PW is as long as the interval I1 or I2, it will work as a brake against a further rotation of the rotor 13 past the stable position B. The pulse width of the drive pulse PW is preferably shorter than the immediately prior interval I1. To this end, it is contemplated that the pulse width W of a (i+1)-th drive pulse or subsequent drive pulses is controlled to (Ii−i0) with the predetermined time i0 set for an interval Ii (i-th interval) that is counted. It is also contemplated that I×α is set to the pulse width of a next drive pulse with the appropriate rate a set to be (0<α<1). It is further contemplated that, in another control method, the drive pulse is stepwise switched to shorter pulse width one as the interval Ii gets shorter when the pulse widths of the drive pulses are stepwise selected.

Since the timing device 1 of this example includes the generator 40, the supply voltage supplied to the drive circuit 30 varies. Even in an electronic apparatus employing a primary battery, its supply voltage may vary depending on power consumption. Although the voltage step-up circuit 49 can control the variations in voltage in such a case, its voltage adjustment is stepwise. As the supply voltage rises, the root-mean-square power of the drive pulse PW increases, the speed of the rotor 13 increases, separating the first peak from the drive pulse becomes difficult, and the effect of the transient current and spike noise becomes pronounced. The control circuit 25 monitors the supply voltage of the power supply, and supplies a drive pulse PW of a narrow pulse width W when the supply voltage rises in order to reliably obtain the detected timing DT. When the supply voltage of the power supply drops, the control circuit 25 preferably supplies a drive pulse PW of a wide pulse width to assure root-mean-square power and to increase the rotational speed of the rotor 13 to result in a sufficiently strong feedback-induced voltage. The control of the pulse width is advantageous in keeping constant the quick-moving operation speed, because the drive pulse of the small root-mean-square power with its pulse width narrow is supplied when the supply voltage rises, and the drive pulse of the large root-mean-square power with its pulse width wide is supplied when the supply voltage drops.

The supply voltage of the power supply may drop even further, reducing the rotational speed of the rotor 13 and lowering the feedback-induced voltage too low to detect its level. The control circuit 25 shifts to a regular driving mode for supplying the drive pulse PW at a fixed period when the voltage of the power supply 41 becomes extremely low, and supplies the drive pulse for the quick-moving operation at regular timings even if no detected timing is obtained, in order to continue the quick-moving operation.

Specifically, in the self-exciting drive in which the first peak PP1 is detected by determining the rotation or non-rotation of the rotor before outputting a next drive pulse PW, a next cycle for supplying the next drive pulse cannot be entered if the detected timing is not obtained. When no detected timing is obtained from the detector circuit 75 in the control circuit of this example, a next drive pulse different in polarity from that of the immediately prior drive pulse PW is supplied after a predetermined time elapse assuming that the rotor 13 has rotated, and the quick-moving operation speed is thus maintained.

The process to be performed in the event of failure to obtain the detected timing DT is not limited to this, and it is acceptable that an auxiliary pulse P2 of a sufficiently large root-mean-square power and of the same polarity as that of the immediately prior drive pulse PW may be supplied after a predetermined time elapse. With this arrangement, the rotor is reliably rotated, and a faulty watch hand driving is successfully precluded. Alternatively, a magnetic pole position detection process is performed in which a drive pulse at a level that permits the rotor 13 to swing rather than rotating is supplied and the corresponding feedback-induced voltage is detected, and after checking the position of the rotor 13, a drive pulse having the polarity matching the detected position is supplied to continue the quick-moving operation.

Alternatively, the motion of the rotor is picked up at the same timing as in the normal speed hand driving assuming that no quick-moving operation is carried in the self-exciting driving mode, when the detected timing DT is not available. Specifically, the rotation or non-rotation of the rotor 13 is determined by detecting a second peak PM2 or PP2 of the feedback-induced voltage attributed to the motion of the rotor 13. When the rotor 13 is not rotated, the control circuit 25 supplies an auxiliary pulse P2 of a sufficiently large root-mean-square power while supplying a drive pulse of a stepwise larger root-mean-square power from that of the immediately prior drive pulse, and in this way, the pulse width control for the normal watch hand driving is thus implemented in the quick-moving operation. When the drive pulse of the root-mean-square power capable of driving the rotor stably is obtained, the self-exciting driving mode for detecting the first peak PP1 may be called to increase the quick-moving operation speed.

[Start of the quick-moving operation]

Figure 6:
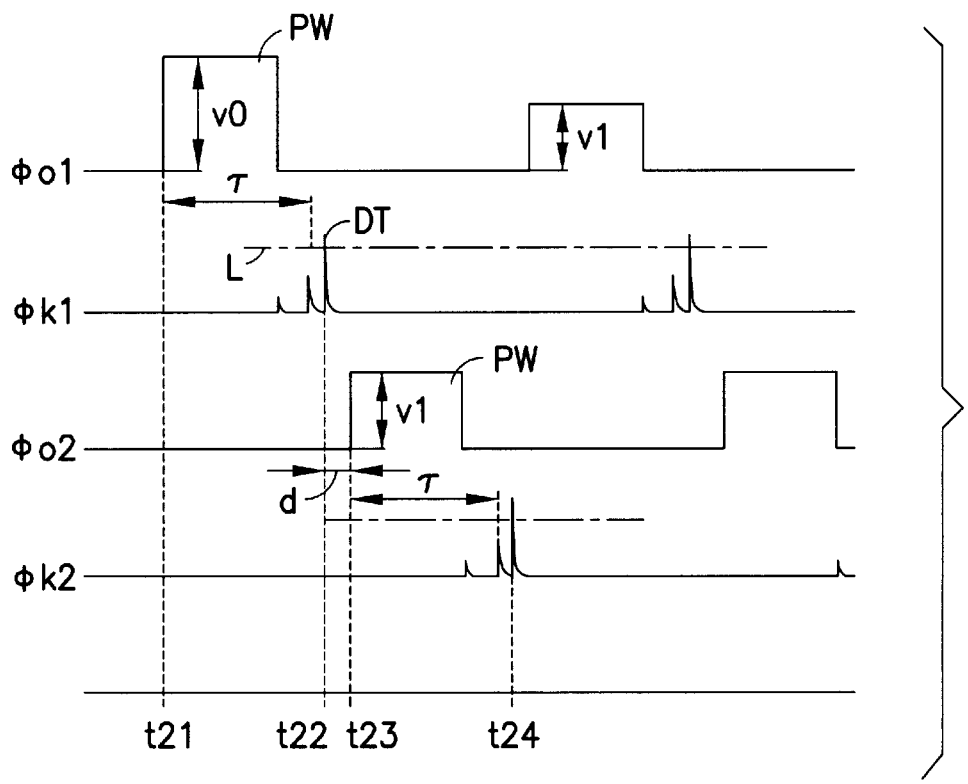
FIG. 6 is a timing diagram showing the process for the start of the quick-moving operation, executed in the timing device shown in FIG. 1.

FIG. 6 shows one example of the process for starting the self-exciting driving mode. To reliably detect the first peak PP1 of the feedback-induced voltage in the self-exciting driving mode, the value of the first peak is preferably large. However, at the start of the quick-moving operation (startup time including the first drive pulse at the start of driving and subsequent several pulses), the speed of the rotor 13 is small, the feedback-induced power is small, and the first peak is low. The probability of successful detection of the first peak is therefore likely to be low. In this example, the voltage step-up circuit 49 increases the supply voltage so that a drive pulse PW of a high voltage VO higher than a voltage V1 of the subsequent drive pulse PW is output at time t21 to accelerate the rotor 13. A feedback-induced voltage sufficiently high enough to reach the detection level L is obtained at time t22, and the detected timing DT is thus obtained. The self-exciting driving mode is thus performed with time t22 serving as a starting point for the next cycle, and after an appropriate delay time d, the drive pulse PW of the normal voltage V1 is output to continue the quick-moving operation.

The process at the start of the quick-moving operation is not limited to this, and for example, the detection level L may be lowered to detect the feedback-induced voltage at the start of the quick-moving operation considering that the feedback-induced voltage is low at the start of the quick-moving operation. The control circuit 25 may select the regular driving mode for supplying the drive pulse regularly, rather than the self-exciting driving mode, and may shift to the self-exciting driving mode at the moment the rotor 13 attains a certain speed.

To preclude a faulty watch hand driving at the start of the quick-moving operation, the root-mean-square power of the drive pulse P1 for the normal hand driving that was performed immediately prior to the start of the quick-moving operation is preferably referenced, and a drive pulse PW of a root-mean-square power equal to or greater than the root-mean-square power of the drive pulse P is preferably supplied to rotate the rotor reliably.

A residual magnetic flux of the immediately prior drive pulse P1 remaining in the stator 12 at the start of the quick-moving operation hinders the rotor 13 from increasing its speed. The control circuit 25 may supply a degaussing pulse PE opposite in polarity to that of the immediately prior drive pulse P1 for the normal rotation, at the start of the quick-moving operation, to degauss the stator 12 to accelerate the rotor 13.

Figure 7:
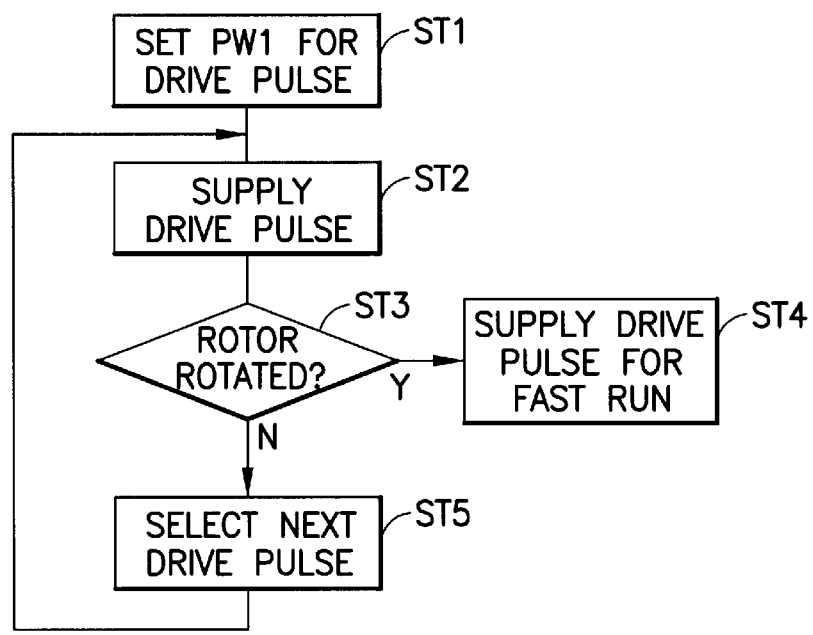
FIG. 7 is a flow diagram showing the process for the start of the quick-moving operation, executed in the timing device shown in FIG. 1.

Referring to FIG. 7, when the control circuit 25 has the function of supplying a plurality of drive pulses PW1–PWn having stepwise increasing root-mean-square powers in terms of pulse width or the like, the control circuit 25 selects a drive pulse PW of a minimum root-mean-square power at step ST1, supplies it in step ST2, and detects the position of the rotor 13 in step ST3. If the rotor 13 has rotated, the control circuit 25 starts the quick-moving operation adopting the drive pulse of that root-mean-square power in step ST4. On the other hand, if the rotor 13 fails to rotate, the control circuit 25 selects and supplies a drive pulse of one notch higher root-mean-square power in step ST5. These steps are repeated until the rotor 13 starts rotating, and the quick-moving operation is thus started with the drive pulse of a minimum root-mean-square power. Alternatively, the control circuit 25 may supply the drive pulses, one by one, in the order of magnitude of root-mean-square power, from large to small power, and finds when the rotor 13 stops rotating, and selects and supplies the drive pulse, immediately before the rotation stop, of a minimum root-mean-square power still capable of rotating the rotor 13.

[End of the quick-moving operation]

Figure 8:
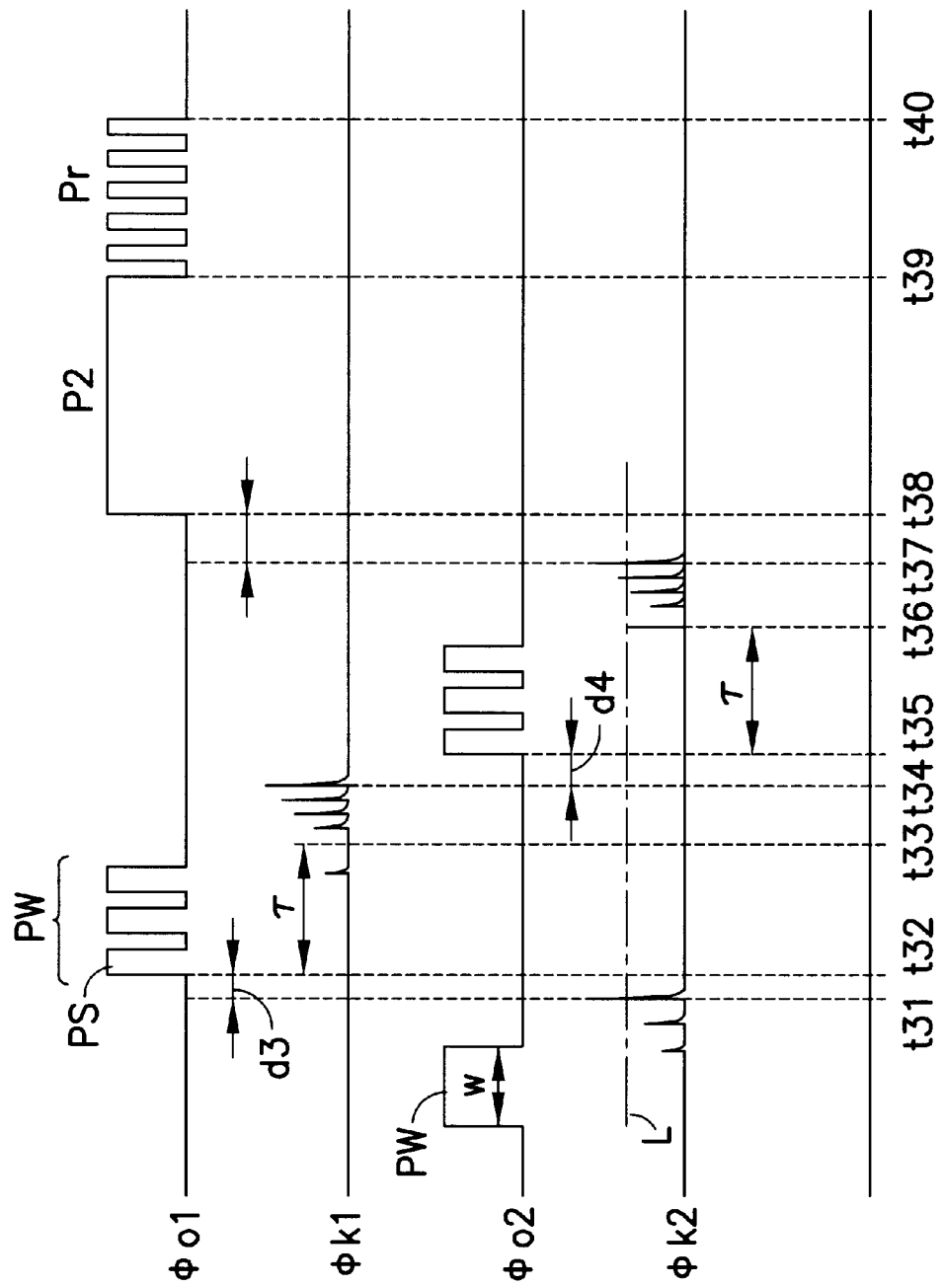
FIG. 8 is a timing diagram showing the process for the end of the quick-moving operation, executed in the timing device shown in FIG. 1.

FIG. 8 shows one example of the process for ending the self-exciting driving mode, in which a final drive pulse and several drive pulses prior to the final drive pulse are supplied at the end of the quick-moving operation. Since the quick-moving operation is used to set the timing device 1 for the correct time in the timing device 1 of this example, the quick-moving operation is preferably finished within a predetermined time. Specifically, it is necessary to stop the stepping motor 10 without overrunning at the end of the quick-moving operation and to shift to the normal hand driving. In this example, at the end of the quick-moving operation, the control circuit 25 supplies an auxiliary pulse P2 of a sufficiently large root-mean-square power and further a regenerative pulse Pr for regenerating the feedback-induced power of the rotor 13 to restrain the rotor 13. Prior to them, the control circuit 25 supplies a drive pulse PW of a large root-mean-square power, composed of a plurality of sub-pulses PS to slow the rotational speed of the rotor 13 for smooth stopping. The combination of the regenerative pulse Pr and the drive pulse PW can end the quick-moving operation, or the regenerative pulse Pr only can end the quick-moving operation.

The control circuit 25 of this example enters a rest mode at the moment the detected timing DT is obtained at time t31, and supplies a comb-like drive pulse PW of a large root-mean-square power, composed of a plurality of sub-pulses PS, at time t32, after an appropriate delay time d3. This drive pulse restrains the rotor 13 longer, gradually slowing down the rotational speed of the rotor 13 and thereby providing an environment under which the rotor 13 is easy to stop. The same process may be carried out by using a wide-width drive pulse of a large root-mean-square power.

At time t33, after an appropriate mask time $\tau$, the chopper amplification is performed to detect the feedback-induced voltage, and the detected timing DT is obtained at time t34. In this example, after a delay time d4 that is longer than that in previous cycle, the drive pulse PW for stopping is supplied, and the timing at which the rotor 13 is swung is deviated from the timing at which the drive pulse is supplied so that the rotational energy held by the rotor 13 is reduced to slow down the rotor speed.

At time t35, after a slightly longer delay time d4, a next drive pulse PW is supplied, and the chopper amplification is started at time t36, after a mask time $\tau$, to detect the feedback-induced voltage. At time t37, the amplified feedback-induced voltage reaches the detection level L and the detected timing is obtained, and at time t38, after a delay time, an auxiliary pulse P2 for stopping finally the rotor 13 is supplied, and a regenerative pulse Pr is supplied at time t39 in succession. The auxiliary pulse P2 has a high root-mean-square power with its very wide pulse width, strong enough to rotate the rotor 13 to a next stepping angle, and keep it at its stepping angle. By supplying the regenerative pulse Pr in succession, the energy for swinging the rotor 13 is regenerated to stabilize the rotor 13.

When the regenerative pulse Pr ends at time t40, the rotor 13 is stopped at an approximately predetermined stepping angle, and the rotor 13 is continuously driven by a standard 1 Hz pulse.

The process for ending the quick-moving operation is not limited to this, and when ending the quick-moving operation, the control circuit shifts from the self-exciting driving mode to the regular driving mode in which the drive pulse is regularly supplied regardless of the detected timing, and the quick-moving operation is stopped after rotating the rotor at an appropriate speed in a stabilized state.

A transmission device having a low inverse transmission efficiency is preferably used as a path (gear train) for transferring the rotor force of the stepping motor to a driven unit such as hands, so that the effect of inertia of the driven unit driven by the stepping motor for the watch hands and gear trains is controlled. The technique of the transmission device having a low inverse transmission efficiency is disclosed in Japanese Unexamined Patent Publication No. 55-18925 and Japanese Unexamined Patent Publication No. 55-17275.

The self-exciting driving mode is used to perform the quick-moving operation in reverse (reverse run). To start the reverse run, the detector circuit 75 sets the second detected timing at which the rotation can be started in the reverse direction in accordance with the feedback-induced voltage, and a drive pulse for reverse rotation is supplied at that timing. Prior to the start of the reverse rotation, the control circuit usefully supplies an auxiliary pulse for reverse rotation, opposite in polarity to that of the first drive pulse for reverse rotation, and of a smaller root-mean-square power to cause a reactionary force to assist the rotor 13 to rotate smoothly in the reverse direction.

[Stop control of the drive pulse]

Figure 9:
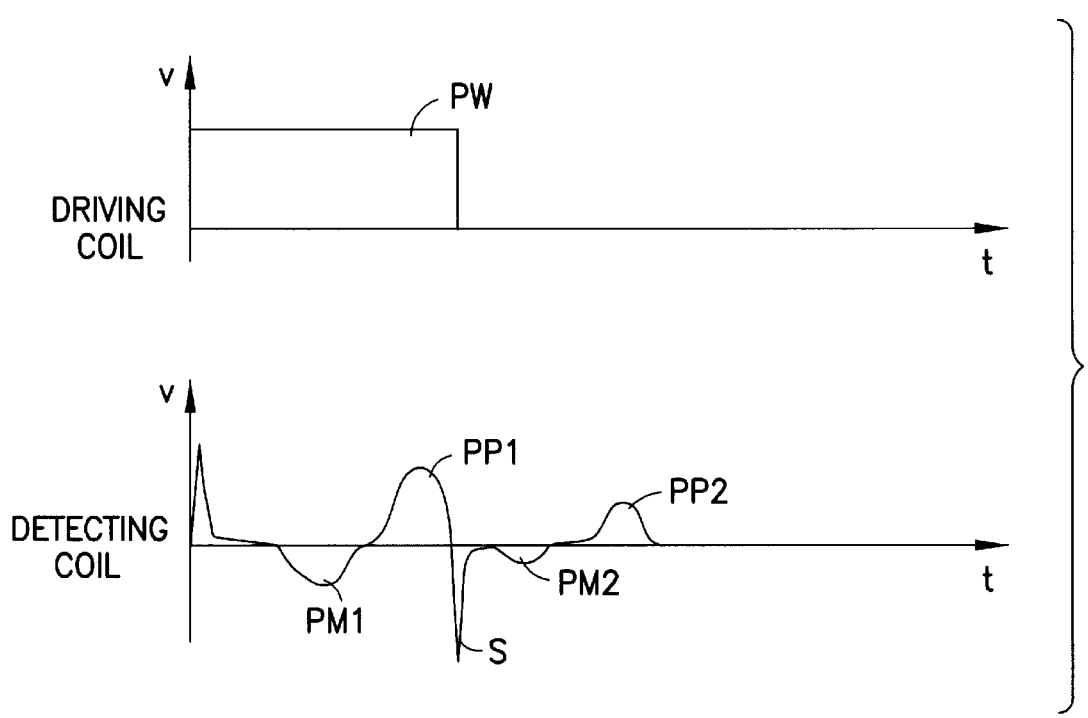
FIG. 9 diagrammatically shows the voltage variations in the driving coil and the detecting coil, in the process for controlling the stop timing of a drive pulse in accordance with a detected timing, in the timing device shown in FIG. 1.
Figure 10:
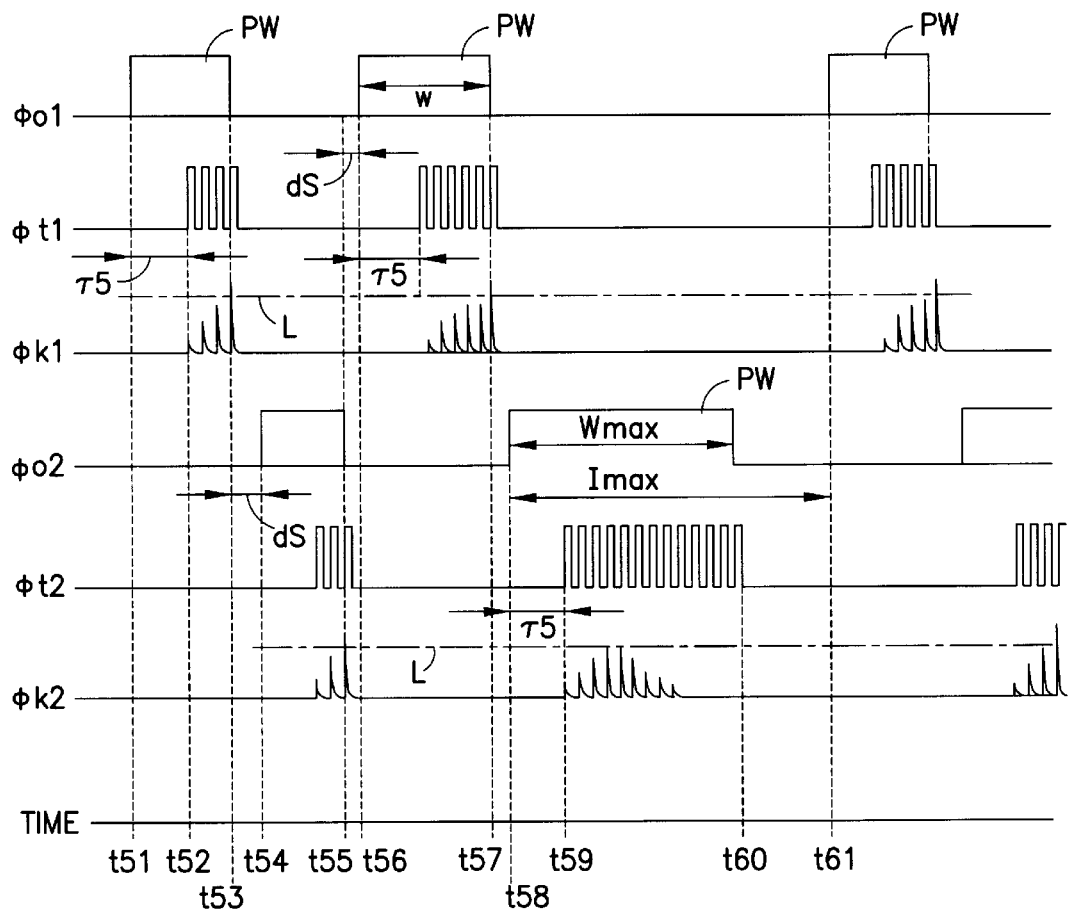
FIG. 10 is a timing diagram showing the process for controlling the stop timing of the drive pulse in accordance with the detected timing, in the timing device shown in FIG. 1.

FIG. 9 and FIG. 10 show an example in which the pulse width of the drive pulse PW is controlled by detecting the feedback-induced voltage. Since, as described above, obtaining the detected timing DT verifies that the rotor 13 has rotated to a predetermined position, the control of the rotor 13 is reliably performed by setting the stop timing for stopping the drive pulse PW (transitioning from its high level to its low level) after obtaining the detected timing DT. Referring to FIG. 9, there is shown a relationship between the drive pulse PW obtained in this example and the feedback-induced voltage. In this example, the drive pulse PW is stopped after detecting the first peak PP1 subsequent to the supply of the drive pulse PW. Since the spike S at the stop of the drive pulse PW appears subsequent to the first peak PP1, the effect of the spike S is controlled.

FIG. 10 shows one example of the process for the self-exciting driving mode including the stop control of the driving pulse. When the drive pulse PW is output at time t51, the chopper pulse is output based on a control signal $\phi$t1 at time t52, after an appropriate mask time $\tau$5. The level of the feedback-induced voltage, amplified according to the chopper pulse, appears in a signal $\phi$k1. The mask time $\tau$5 is set to an appropriate time so that the spike noise and other noise at the output of the drive pulse PW are not picked up. When the level of the amplified feedback-induced voltage reaches the detection level L at time t53, the detected timing DT is obtained. In this example, the stop timing of the drive pulse PW is set to match the moment the detected timing DT is obtained, and the drive pulse PW is stopped at time t53, and the next cycle for outputting a next drive pulse is entered at the same time. In this example, the detected timing DT determines the stop timing of the drive pulse while determining the output timing of the next drive pulse at the same time.

Time t54, an appropriate delay time d5 after the detected timing DT, is determined to be the output timing of the next drive pulse PW, and the drive pulse PW is output. When the detected timing DT is obtained at time t55 in the same way as above in response to this drive pulse PW, this detected timing DT is determined to a stop timing, and the drive pulse PW is stopped. The next cycle is carried out in the same way, but if the amplified feedback-induced voltage reaches the detection level L with a delay for some reason, with respect to time t56 at the moment the drive pulse was output, the detected timing DT is shifted to time t57. The stop timing is thus extended to time t57, and the drive pulse PW is continuously output throughout this duration, and as a result, a drive pulse PW of a wide pulse width W is output.

In the self-exciting driving mode in this example, the output timing of the drive pulse PW is determined based on the detected timing DT, and the stop timing for stopping the drive pulse PW is also determined based on the detected timing DT. Both the timing and the pulse width of the drive pulse PW are set in agreement with the status of the rotor, the rotor 13 is reliably rotated, and a reverse rotation or the like is successfully precluded. This arrangement allows an even more reliable quick-moving operation. Even when the supply voltage varies and even when the load torque of the rotor varies, a drive pulse of a sufficient root-mean-square power, which compensates for these variations, is automatically fed to the stepping motor, thereby driving the rotor in a highly reliable manner.

Although this example employs the detecting coil 71 besides the driving coil 11 in the above discussion, the driving coil 11 may be used to obtain the detected timing during the supply of the drive pulse. To this end, the control circuit 25 may supply a drive pulse, composed of a plurality of sub-pulses, and the feedback-induced power attributed to the rotation of the rotor 13 may be detected during an interval between sub-pulses, under the condition that the effect of the drive pulse is none or marginal.

When the detected timing is not available for some reason, specifically, when the drive pulse PW is output at time t58, the feedback-induced voltage is amplified by the chopper pulse at time t59, after a mask time τ5, but the amplified feedback-induced voltage fails to reach the detection level L, and in such a case, the drive pulse is forced to stop at time t60 at the moment a maximum pulse width Wmax elapses. A next drive pulse PW is output at time t61, after an appropriate maximum interval Imax elapses from time t58 at the moment the drive pulse was output. In this way, the control circuit 25 stops the drive pulse after the predetermined time elapse and the next cycle is entered, and the quick-moving operation is thus continued.

In this self-exciting driving mode, at the end of the quick-moving operation, an appropriate delay time is set up between the detected timing and the stop of the drive pulse, forcing the pulse width of the drive pulse to extend and thereby gradually slowing down the speed of the rotor 13.

As described above, the timing device 1 in this example detects the feedback-induced voltage attributed to the rotation of the rotor 13 to obtain the timing (detected timing) of an initial peak (first peak), and controls the timing for outputting the subsequent drive pulse in accordance with the detected timing. As described above, the pulse width itself of the drive pulse is controlled by the detected timing. With this arrangement, the rotor 13 is reliably rotated, while the drive pulse is supplied at the timing in agreement with the rotational speed of the rotor 13. For this reason, the quick-moving operation is carried out with a small power consumption and at a stable high speed.

The waveforms of the drive pulse PW, the chopper pulse and the auxiliary pulse P2 described above are for example only, and are set in accordance with the characteristics of the stepping motor 10 employed in the timing device. Although the present invention has been discussed in connection with the timing device employing a preferred two-phase stepping motor, the present invention is applied to a stepping motor of three phase or higher phases. Rather than performing a control common to all phases, it is possible to supply each phase with its respective drive pulse of an appropriate pulse width at an appropriate timing. The driving method of the stepping motor is not limited to 1-phase excitation, and may be 2-phase or 1–2-phase excitation. The present invention is not limited to the timing device, and may be applied to a chronograph and a multi-function watch, and other electronic apparatuses incorporating the stepping motor.

INDUSTRIAL APPLICABILITY

As described above, according to the present invention, the first peak of the feedback-induced power is captured to determine the position of the rotor, and the next drive pulse is supplied at the timing appropriate for the position of the rotor without consuming unnecessarily extra time. The stepping motor fast runs in the quick-moving operation and an electronic apparatus such as a timing device that has the function of automatic time setting using the stepping motor is thus provided.

What is claimed is:

1. An electronic apparatus comprising:
   a stepping motor, the stepping motor having a stator having a driving coil and a multi-magnetic-pole rotor mounted in the stator for rotation near the stator;
   a drive unit for supplying a drive pulse to the driving coil to drive the rotor;
   a drive control unit for controlling the drive unit to supply a quick-moving operation drive pulse to the driving coil and for adjusting the timing of the quick-moving operation drive pulse; and
   a position detector unit for detecting a first peak of power of the same polarity as a drive pulse immediately prior to the first peak, from the feedback-induced power resulting from the rotation of the rotor,
   wherein the drive control unit controls the output timing of a subsequent drive pulse based on the detected timing of the first peak.

2. An electronic apparatus according to claim 1, wherein the stator of the stepping motor further comprises a detecting coil, and
   the position detector unit detects a power feedback-induced in the detecting coil.

3. An electronic apparatus according to claim 2, wherein the driving coil and the detecting coil are coaxially wound, and at least one of the driving coil and detecting coil being wound internally in a regular winding fashion.

4. An electronic apparatus according to claim 2, wherein the position detector unit detects a feedback-induced power in response to the rotation of the rotor when the drive control unit supplies a normal-speed drive pulse.

5. An electronic apparatus according to claim 1, wherein the position detector unit detects a feedback-induced power that was amplified by a chopper pulse of the same polarity as the immediately prior drive pulse.

6. An electronic apparatus according to claim 5, wherein at least one of the timing, the frequency and the duty factor of the chopper pulse is selected.

7. An electronic apparatus according to claim 1, wherein the position detector unit sets a predetermined duration of time, based upon the immediately prior drive pulse, as a dead time during which a feedback-induced power attributed to the rotation of the rotor is not detected.

8. An electronic apparatus according to claim 1, wherein the position detector unit acquires the detected timing by comparing a feedback-induced power in response to the rotation of the rotor to a reference level.

9. An electronic apparatus according to claim 8, wherein the position detector unit comprises an inverter for detecting a feedback-induced power resulting from the rotation of the rotor.

10. An electronic apparatus according to claim 8, wherein the stator is a one-body stator with a magnetically saturated portion.

11. An electronic apparatus according to claim 1, further comprising a power supply unit for supplying a power to the drive unit, wherein the drive control unit supplies a drive pulse of a narrow pulse width when the supply voltage of the power supply unit rises.

12. An electronic apparatus according to claim 1, further comprising a power supply unit for supplying power to the drive unit, wherein the drive control unit supplies a drive pulse of a wide pulse width when the supply voltage of the power supply unit falls.

13. An electronic apparatus according to claim 1, further comprising a power supply unit for supplying power to the drive unit, wherein the drive control unit supplies a drive pulse at fixed time periods when the supply voltage of the power supply unit falls.

14. An electronic apparatus according to claim 11, wherein the power supply unit is of a charge and discharge type.

15. An electronic apparatus according to claim 1, wherein the drive control unit supplies a drive pulse of a narrow pulse width when a time period of the timing detected by the position detector unit becomes short, and supplies a drive pulse of a wide pulse width when the time period of the timing detected by the position detector unit becomes long.

16. An electronic apparatus according to claim 15, wherein the drive control unit supplies a drive pulse, which is shorter in pulse width by a predetermined time than a time interval between the output of the drive pulse and the detected timing, at the timing of a subsequent drive pulse.

17. An electronic apparatus according to claim 15, wherein the drive control unit supplies a drive pulse, which is shorter in pulse width than and proportional to a time interval between the output of the drive pulse and the detected timing, at the timing of the subsequent drive pulse.

18. An electronic apparatus according to claim 15, wherein the drive control unit selects one from among a series of predetermined drive pulses having stepwise increasing pulse widths, and outputs at the timing of the subsequent drive pulse, a drive pulse having one of a longer and shorter pulse width than the immediately prior drive pulse that was output, depending on the interval between the output of the immediately prior drive pulse and the detected timing.

19. An electronic apparatus according to claim 1, wherein the drive control unit supplies a drive pulse of a predetermined power, and wherein the drive control unit supplies a drive pulse opposite in polarity to the immediately prior drive pulse after a predetermined time elapse, when no detected timing is provided by the position detector unit.

20. An electronic apparatus according to claim 1, further comprising a voltage step-up unit for stepping up the supply voltage supplied to the drive unit, wherein the drive control unit supplies the supply voltage, stepped up by the voltage step-up unit, to the drive unit at the start of a quick-moving operation.

21. An electronic apparatus according to claim 1, wherein the position detector unit sets to be low the detection threshold value of the feedback-induced voltage resulting from the rotation of the rotor, at the start of a quick-moving operation.

22. An electronic apparatus according to claim 1, wherein the drive control unit supplies the drive pulse regularly at the start of a quick-moving operation.

23. An electronic apparatus according to claim 1, wherein the drive control unit supplies the drive pulse of a root-mean-square power equal to or larger than the root-mean-square power of the drive pulse required for normal rotation, at the start of a quick-moving operation.

24. An electronic apparatus according to claim 1, wherein the drive control unit supplies a degaussing pulse opposite in polarity to the immediately prior drive pulse for normal rotation, at the start of a quick-moving operation.

25. An electronic apparatus according to claim 1, wherein the drive control unit selects one from among a series of predetermined drive pulses having stepwise increasing root-mean-square powers, and selects and supplies drive pulses, one by one, in the increasing order of magnitude of root-mean-square power, from small to large power, at the start of a quick-moving operation, and performs the quick-moving operation with a quick-moving operation drive pulse having a minimum root-mean-square power that still rotates the rotor.

26. An electronic apparatus according to claim 1, wherein the drive control unit selects one from among a series of predetermined drive pulses having stepwise increasing root-mean-square powers, and selects and supplies drive pulses, one by one, in the decreasing order of magnitude of root-mean-square power, from large to small power, at the start of a quick-moving operation, and performs the quick-moving operation with a quick-moving operation drive pulse having a minimum root-mean-square power that still rotates the rotor.

27. An electronic apparatus according to claim 1, wherein the drive control unit supplies, at the end of a quick-moving operation, an auxiliary pulse of a large root-mean-square power or a regenerative pulse for regenerating the power feedback-induced by the rotor.

28. An electronic apparatus according to claim 1, wherein the drive control unit supplies regularly the drive pulse at the end of a quick-moving operation.

29. An electronic apparatus according to claim 1, wherein the drive control unit supplies the drive pulse of a large root-mean-square power at the end of a quick-moving operation.

30. An electronic apparatus according to claim 1, wherein the drive control unit supplies the drive pulse composed of a plurality of sub-pulses at the end of a quick-moving operation.

31. An electronic apparatus according to claim 1, wherein the drive control unit supplies an auxiliary pulse of a small root-mean-square power and opposite in polarity to a drive pulse for a reverse rotation, prior to the start of the reverse rotation.

32. An electronic apparatus according to claim 1, wherein the drive control unit controls the stop timing of the drive pulse, based on the detected timing provided by the position detector unit.

33. An electronic apparatus according to claim 32, wherein the drive control unit supplies from the drive unit a plurality of sub-pulses forming the drive pulse, and wherein the position detector unit detects a feedback-induced power resulting from the rotation of the rotor when the sub-pulses are at a low level.

34. An electronic apparatus according to claim 32, wherein the stator of the stepping motor comprises a detecting coil, and the position detector unit detects a power feedback-induced in the detecting coil.

35. An electronic apparatus according to claim 32, wherein the position detector unit sets a predetermined duration of time, referenced to the immediately prior drive pulse, as a dead time during which a feedback-induced power attributed to the rotation of the rotor is not detected.

36. An electronic apparatus according to claim 32, wherein the drive control unit sets the stop timing for stopping the drive pulse after a predetermined time elapse when no detected timing is provided by the position detector unit.

37. An electronic apparatus according to claim 32, wherein the drive control unit sets the stop timing of the drive pulse after a predetermined delay time subsequent to the timing detected by the position detector unit, and controls the delay time at the end of a quick-moving operation.

38. An electronic apparatus according to claim 12, wherein the power supply unit is of a charge and discharge type.

39. An electronic apparatus according to claim 13, wherein the power supply unit is of a charge and discharge type.

40. An electronic apparatus according to claim 1, wherein the drive pulse immediately prior to the first peak is a chopper pulse.

\* \* \* \* \*